No. 798,390. PATENTED AUG. 29, 1905.
P. J. CAESAR & E. SCHELL.
WHEEL.
APPLICATION FILED NOV. 19, 1904.
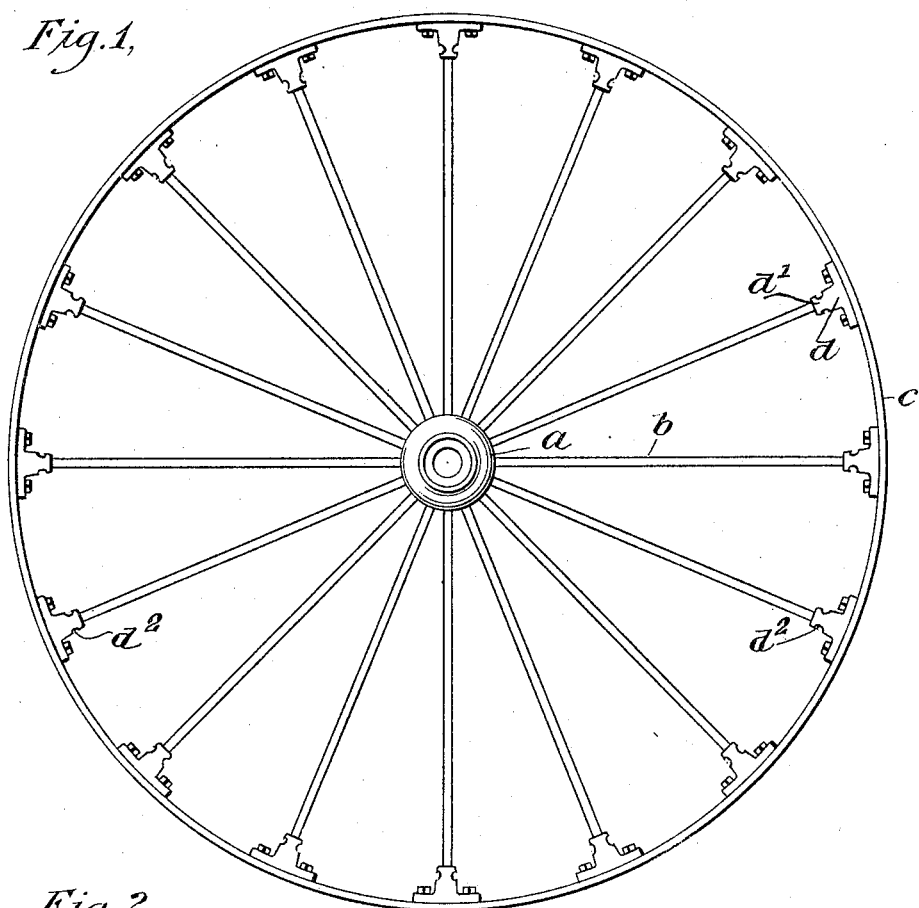
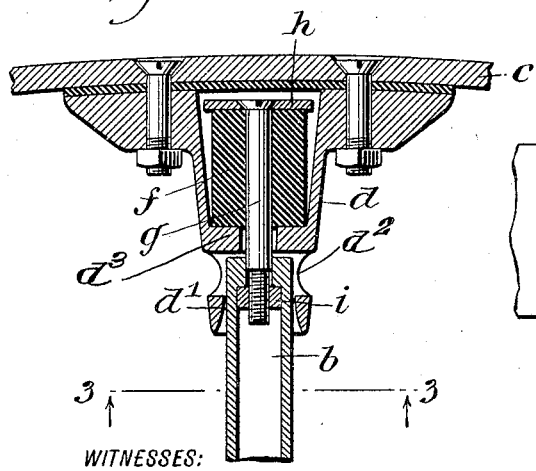
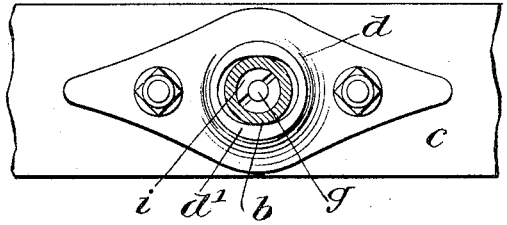
WITNESSES:
Edward Thorpe.
Isaac B. Owens.
INVENTORS
Peter J. Caesar
Emil Schell
BY
ATTORNEYS

UNITED STATES PATENT OFFICE.

PETER J. CAESAR AND EMIL SCHELL, OF ST. PAUL, MINNESOTA.

WHEEL.

No. 798,390. Specification of Letters Patent. Patented Aug. 29, 1905.

Application filed November 19, 1904. Serial No. 233,496.

*To all whom it may concern:*

Be it known that we, PETER J. CAESAR and EMIL SCHELL, citizens of the United States, and residents of St. Paul, in the county of Ramsey and State of Minnesota, have invented a new and Improved Wheel, of which the following is a full, clear, and exact description.

The object of this invention is to construct a resilient wheel which will wholly or partly avoid the necessity of springs on the vehicle with which the wheel is used. We attain this end by a certain peculiar connection between the spokes and rim of the wheel, which involves a spring or cushion and which results in a resilient action between the spokes and rim, as will hereinafter be fully set forth.

Reference is had to the accompanying drawings, which form part of this specification, in which drawings like characters of reference indicate like parts in the several views, and in which—

Figure 1 is a side elevation of a wheel embodying our invention. Fig. 2 is an enlarged section showing a part of the rim and the outer end of one spoke and illustrating the peculiar connection between the two, and Fig. 3 is a section on the line 3 3 of Fig. 2.

$a$ indicates the hub of the wheel, $b$ the spokes, and $c$ the rim. The spokes are joined to the hub in the usual or any desired manner, and said spokes are preferably tubular, as shown in Figs. 2 and 3. Attached to the inner side of the rim $c$ are a number of housings $d$, the inner extremities of which have sockets $d'$ opening toward the hub and receiving the outer ends of the tubular spokes $b$. These sockets are separated from the inner parts of the housing by walls $d^3$. Within the housings $d$ springs $f$ are arranged. These springs are preferably formed of blocks of rubber, and passing through them are bolts $g$, the outer ends of which are provided with head-plates $h$, engaging the outer ends of the springs $f$. From the springs or cushions $f$ the bolts $g$ pass inward through the walls $d^3$ into the sockets $d'$ and enter the outer ends of the spokes $b$. The parts $g$ and $b$ are fastened together by means of nuts $i$, engaged with the bolts and seated against interior shoulders in the outer ends of the tubular spokes $b$.

$d^2$ indicates openings in the housings $d$ to lighten the same.

The spokes $b$ are free to move in the sockets $d'$, within the limits, however, of the springs $f$ on one hand and walls $d^3$ on the other, said springs through the bolts $g$ restraining the movement of the spokes inward with respect to the rim. When, therefore, the wheel is in operation, no compression strain is exerted on the spokes, the hub being sustained within the rim through the medium of the spokes at the upper side of the hub and the springs $f$ in connection therewith. In this manner a spring or resilient support is provided for the hub and the entire wheel given a spring action.

Various changes in the form, proportions, and minor details of our invention may be resorted to at will without departing from the spirit and scope thereof. Hence we consider ourselves entitled to all such variations as may lie within the terms of our claims.

Having thus described our invention, we claim as new and desire to secure by Letters Patent—

1. A wheel comprising a hub, a rim, spokes attached to the hub, housings attached to the inner side of the rim, said housings having sockets in their inner portions divided from the main parts of the housing by intermediate walls, and said sockets receiving the outer ends of the spokes, a spring in the main part of each housing, and a connection between the springs and the spokes.

2. A wheel comprising a hub, a rim, spokes attached to the hub, housings attached to the inner side of the rim, said housings having sockets in their inner portions divided from the main part of the housing by intermediate walls, and said sockets receiving the outer ends of the spokes, a spring in the main part of each housing, and a connection between the springs and the spokes, said connection comprising bolts engaged with the springs and passing through said intermediate walls and engaged with nuts in the spokes.

In testimony whereof we have signed our names to this specification in the presence of two subscribing witnesses.

PETER J. CAESAR.
EMIL SCHELL.

Witnesses:
E. S. PEARCE,
OSCAR JOHNSON.